United States Patent Office 3,353,816
Patented Nov. 21, 1967

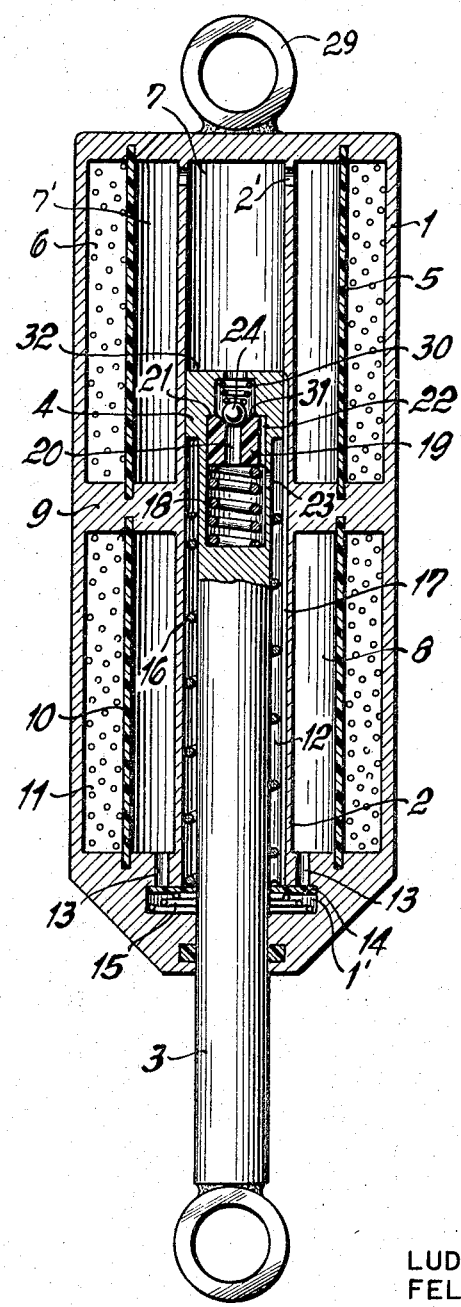

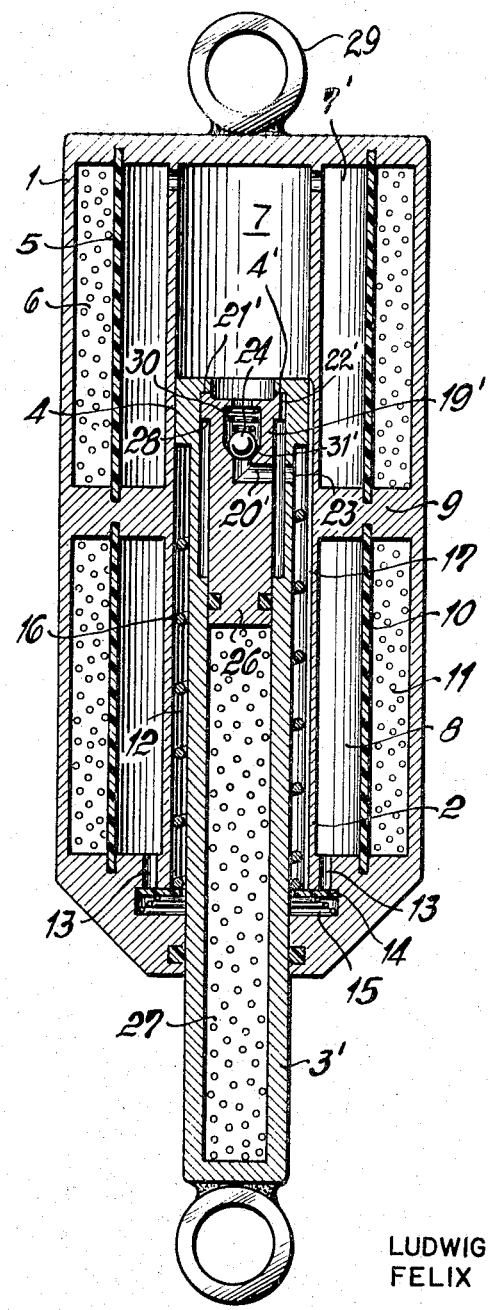

3,353,816
SELF-LEVELING HYDROPNEUMATIC
SUSPENSION UNIT
Ludwig Axthammer and Felix Wössner, Schweinfurt, Germany, assignors to Fichtel & Sachs A.G., Schweinfurt (Main), Germany
Filed Dec. 1, 1965, Ser. No. 510,773
Claims priority, application Germany, Dec. 7, 1964, F 44,625
13 Claims. (Cl. 267—64)

This invention relates to suspensions for connecting a sprung mass to an unsprung structure, and particularly to self-leveling hydropneumatic or air-oil suspension units of the type employed between the frame and the axles of automotive vehicles.

The known suspension units include a cylinder and a piston axially movable in the cylinder cavity and defining a chamber in the cylinder. A liquid completely or practically completely filling the chamber is acted upon by a body of compressed gas which resiliently resists inward movement of the piston in the cylinder and thereby functions as a spring between the sprung and unsprung mass respectively fastened to the piston and cylinder. When an unusually heavy static or dynamic load drives the piston deeply into the cylinder, a pump is actuated and delivers additional liquid to the cylinder chamber, thereby expelling the piston from the chamber until it returns to its normal operating position. When the piston is driven too far out of the cylinder by the pressure or the compressed gas, as with an unusually light load, a by-pass is opened to release liquid from the cylinder chamber to a liquid storage space.

The pressure in the storage space is conventionally kept higher than that in the cylinder chamber, and a check valve is provided for controlling liquid flow between the storage space and the cylinder chamber. The pump is energized by the normal oscillating movement of the piston inward and outward of the cylinder during operation of the vehicle. The pumped liquid would ultimately raise the pressure in the cylinder chamber beyond safe limits under unfavorable load conditions unless provisions were made for limiting the amount of liquid supplied by the pump to the cylinder chamber.

An object of the invention is the provision of a suspension unit of the general type described which does not rely on very high pressure in the liquid storage space for operativeness, is simple in its construction and has but very few and rugged movable elements.

The basic feature of the invention is a pump inactivating mechanism which responds to a predetermined high pressure in the cylinder chamber to inactivate the pump. The piston of the unit and its cylinder are partly employed as elements of the pump and cooperate with a suction valve and a pressure valve, the suction valve being used for connecting a supply of liquid in a storage compartment with the pumping compartment in the cylinder, and the pressure valve connecting the pumping compartment with the cylinder chamber proper.

When the vehicle is overloaded, the pressure in the cylinder chamber cannot exceed a preset value, and the gas cushion which normally maintains a minimum pressure in the cylinder chamber thus cannot be overburdened. This is particularly important in suspension units which are arranged in parallel with a conventional spring and are intended to provide assistance for the spring only at full vehicle load, whereas the spring is mainly relied upon for transmitting the load of the vehicle to the wheels at light loads. The ratio between the maximum and minimum loads carried by such an auxiliary suspension unit is much greater than the corresponding ratio in a unit which alone carries the full load, and the danger of destroying an auxiliary unit by excessive internal pressure is particularly great.

It is an important advantage of the invention that it eliminates all danger of excessive internal pressure. Another advantage of the invention resides in the fact that the suspension unit is not self-leveling when overloaded, so that the presence of an excessive load is readily detected by the inclined position or the low position of the vehicle frame.

The pressure-responsive pump deactivating mechanism of the invention preferably includes a relief valve which communicates with the cylinder chamber, may be interposed between the cylinder chamber and the pumping compartment, and may be arranged in the piston rod of the unit.

Other features, additional objects, and many of the attendant advantages of this invention will be readily appreciated from the following detailed description of preferred embodiments when considered with the attached drawing in which:

FIG. 1 shows a hydropneumatic suspension unit of the invention in elevational section; and FIG. 2 shows a modified suspension unit in a view corresponding to that of FIG. 1.

Referring initially to FIG. 1, there is seen a hydropneumatic suspension unit whose external appearance does not significantly differ from that of a conventional automotive shock absorber. A piston rod 3 projects axially downward from an approximately cylindrical vessel 1. Rings 29 are provided on the free end of the piston rod 3 and on the top wall of the vessel 1 for connecting the unit between the frame and axle of a motor car in a conventional manner.

The rod 3 carries a piston 4 which is axially slidable in a tubular cylinder 2 coaxially mounted in the vessel 1. The piston 4 axially divides the cylinder cavity into a chamber 7 and a pumping compartment 12. The ends of the cylinder 2 are fastened to the top and bottom walls of the vessel 1. An annular partition 9 fixedly connects the central portion of the cylinder 2 to the vessel 1, and axially divides the space between the cylinder 2 and vessel 1. Cylindrical membranes 5, 10 of elastomeric material are spacedly interposed between the cylinder 2 and the vessel 1 in the upper and lower half of the vessel space.

The membrane 5 separates an outer highly compressed gas cushion 6 from a space 7' of annular cross section which freely communicates with the cylinder chamber 7 above the piston 4 through radial openings 2' in the wall of the cylinder 2. The membrane 10 similarly divides an outer gas cushion 11 from a storage compartment 8 which is normally completely filled with a liquid that also occupies all the available space in the vessel 1 outside the gas cushions 6, 11.

The space between the piston rod 3 and the cylinder 2 under the piston 4 constitutes the pumping compartment 12 in which a helical compression spring 16 is coiled about the rod 3. In the normal operating condition of the unit illustrated in FIG. 1, the spring 16 is fully relaxed and spaced from the underside of the piston 4. The cylinder 2 has an internal axial groove 17 which is open to the pumping compartment 12, but does not normally extend into the cylinder chamber 7.

A suction valve compartment 1' extends in the heavy bottom wall of the vessel 1 about the piston rod 3. Several axial ducts 13 lead downward from the pumping compartment 12 into the valve compartment 1', and are normally blocked by an annular valve disc 14 under the pressure of a spiral spring 15. The compression spring 16 rests under its own weight on the valve disc 14, and there is sufficient clearance between the disc and the piston rod 3 to permit free flow of liquid between the suction valve compartment 1' and the pumping compartment 12.

The piston 4 and the terminal portion of the piston rod 3 adjacent the piston rod 4 are formed with an axial bore 25 of stepped cylindrical shape. The lower axial end portion of the bore 25 is widest and coaxially receives a helical compression spring 18 which supports a relief valve 19, and urges the top face 21 of the valve 19 into abutting, sealing engagement with an internal shoulder of the piston 4 in the bore 25. The valve 19 is a generally cylindrical, heavy-walled tube having an axial groove 22 in its outer curved face. Its central axial passage 20 has an upper orifice 31 in the top face 21 which provides a conical seat for a ball 24. The ball is urged against the seat 31 by a compression spring 30 abuttingly interposed between the ball 24 and another internal shoulder 32 of the piston 4 in the bore 25 near the open top end of the latter. Radial bores 23, of which only one is seen in FIG. 1, connect the portion of the bore 25 under the relief valve 19 with the pumping compartment 12 through the wall of the piston rod 3.

The afore-described suspension unit operates as follows:

With a normal static load and moderate variations in the dynamic load on the suspension unit, the piston rod 3 moves inward from the illustrated position over a short distance until the increasing resistance of the gas cushion 6 causes reversal of the direction of rod movement as the dynamic load is reduced. During this phase of operations, the gas cushion 6 functions in the manner of a conventional spring. The relief valve 19 and the ball 24 which constitutes a pressure valve are held in the afore-described illustrated positions by the associated springs. Liquid cannot flow between the chamber 7 and the compartment 8.

When an unusually heavy load causes the piston 4 to shift upward from the illustrated position, and to oscillate about the new position during the usual variations in the dynamic load, liquid flows into the pumping compartment 12 from the storage compartment 8 during the upward stroke of the piston 4 because of the pressure drop in the suction valve compartment 1' which permits the liquid pressure in the storage compartment 8 to overcome the spring 15, and to lift the disc 14 from the lower orifices of the ducts 13.

During the subsequent outward or down stroke of the piston 4, the suction valve disc 15 closes the ducts 13 under the combined pressure of the spring 15 and of the liquid in the valve compartment 1', and the ball 24, which constitutes the pressure valve of the pumping mechanism, is lifted from its seat 31 by the pressure of the liquid filling the connected pumping space 12 and bore 25, and additional liquid is admitted to the cylinder chamber 7.

Pumping of liquid into the chamber 7 continues until the piston moves downward in the cylinder 2 past the illustrated position, whereby the upper end of the groove 17 is exposed in the cylinder chamber 7, and the spring 16 is engaged by the piston 4 to open the suction valve so that liquid may be by-passed about the piston 4 to the low-pressure storage compartment 8. Liquid is similarly released from the chamber 7 if the load on the unit is lightened as by discharging of passengers from the vehicle. The pumping action of the unit thus tends to restore the piston to a range of oscillations near the illustrated position.

If the vehicle is overloaded, continued pumping of liquid into the chamber 7 cannot initiate downward displacement of the piston 4 toward its normal illustrated position in the manner described above, and damage to the unit, particularly to the membrane 5 would occur if the pumping mechanism were not inactivated. At a pressure mainly determined by the selection of the spring 18, the liquid in the chamber 7 displaces the relief valve 19 together with the pressure valve 24 downward from the illustrated position. A gap opens axially between the top face 21 of the relief valve 19 and the normally engaged shoulder of the piston 4, and liquid can pass through that gap and the groove 22 in the relief valve 19 to the lower part of the bore 25, and outward therefrom through the bores 23 into the pumping compartment 12.

As long as the axial gap between the relief valve 19 and the piston 4 is open, the pumping mechanism is inactivated. It can be operative only if the liquid drawn from the storage compartment 8 is driven into the chamber 7, and held there by the pressure valve 24. When the relief valve 19 is displaced, the pressure valve 24 is effectively by-passed. The gap closes when the pressure in the cylinder chamber 7 is reduced to the desired value, and the pump may then again function.

The modified suspension unit of the invention shown in FIG. 2 differs from that described above by having a hollow piston rod 3' integral with a piston 4', the piston and rod carrying a modified relief valve and pressure valve assembly.

The rod 3' encloses a gas-filled cylindrical chamber 27 whose top is sealed by a movable plunger 26 integral with a relief valve 19'. The bore of the piston rod 3' about the relief valve 19' is enlarged, and the annular chamber formed thereby about the valve 19' communicates with a radial bore 23 in the rod 3'. A passage 20' in the relief valve 19' is radially open toward the afore-mentioned annular chamber and has an axial portion which is normally blocked by a spherical pressure valve 24. The valve 24 is urged toward a valve seat 31' in the axial passage portion by a helical compression spring 30 which abuts against an internal shoulder of the valve 19'.

The relief valve 19' has an annular top face 21' which normally sealingly engages an internal radial face of the piston 4' under the pressure of the gas in the chamber 27, and a corresponding downwardly directed annular face 28 in the afore-mentioned chamber. The faces 21' and 28 are equal in area and are connected by an axial groove 22' in the outer cylindrical face of the valve 19'. The device of FIG. 2 is otherwise identical with that shown in FIG. 1.

The suspension unit illustrated in FIG. 2 operates in a manner closely similar to the mode of operation described above with reference to FIG. 1. The gas pressure in the chamber 27 is selected to balance the highest permissible pressure in the cylinder chamber 7. If that pressure is exceeded by pumping of liquid from the storage compartment 8, the valve 19' and plunger 26 are displaced downward, as viewed in FIG. 2 so that liquid can by-pass the pressure valve 24 through the groove 22', and return to the pumping space 12 during upward movement of the piston 4'. Because of the equal area of the valve faces 21' and 28, the relief valve opens and closes gradually and without shock. The downward displacement of the plunger 26 and valve 19' in response to excessive pressure in the chamber 7 causes the effective volume of the chamber to be enlarged, thereby flattening the spring characteristic of the suspension unit.

The two illustrated embodiments of the invention perform their relatively complex tasks by very simple means. The movable elements are few in number, and they are shaped and assembled to minimize wear and other sources of malfunctioning. The built-in pumping arrangement which provides the self-leveling effects is inactivated by a relief valve which by-passes the pressure valve of the pump in response to a set load on the pneumatic spring of the unit.

The suspension unit of the invention is thus capable of operating safely over a wide range of operating loads.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A self-leveling hydro-pneumatic suspension unit comprising, in combination:
   (a) a cylinder member having an axis and formed with a cavity therein;
   (b) a piston member axially movable in said cavity and axially defining a chamber in a portion of the cavity, said chamber expanding and contracting during the axial movement of the piston member outward and inward of said chamber;
   (c) two fastening means for fastening said members respectively to a suspended mass and to a structure from which said mass is to be suspended;
   (d) a liquid substantially filling said chamber;
   (e) yieldably resilient means for maintaining said liquid in the chamber under a pressure substantially greater than atmospheric pressure;
   (f) an additional supply of said liquid;
   (g) pump means for pumping liquid from said supply to said chamber in response to axial reciprocating movement of said piston member in a predetermined axial portion of said cylinder member;
   (h) by-pass means responsive to a position of said piston member outwardly spaced from said predetermined portion of said cylinder member for connecting said chamber to said supply; and
   (i) pump inactivating means responsive to a predetermined pressure in said chamber for inactivating said pump means.

2. A unit as set forth in claim 1, wherein said piston member axially divides said cavity into said chamber and a pumping compartment and constitutes an element of said pump means, the pump means further including suction valve means connecting said supply to said pumping compartment, and pressure valve means connecting said pumping compartment to said chamber.

3. A unit as set forth in claim 2, wherein said pump inactivating means include a pressure relief valve communicating with said chamber.

4. A unit as set forth in claim 3, wherein said relief valve is interposed between said chamber and said pumping compartment.

5. A unit as set forth in claim 4, wherein said piston member has a rod portion extending through said pumping compartment and outward of said cavity of the cylinder member, a part of said rod portion outside said cavity carrying one of said fastening means, said relief valve being arranged in said piston member for movement between an inoperative position and an operative position responsive to the pressure of the liquid in said chamber, said relief valve in the operative position thereof connecting said chamber to said pumping compartment.

6. A unit as set forth in claim 5, further comprising securing means yieldably securing said pressure valve means to said relief valve for movement therewith while permitting movement of the pressure valve means relative to said relief valve for connecting said pumping compartment to said chamber when the pressure of liquid in said pumping compartment exceeds the liquid pressure in said chamber by a predetermined amount.

7. A unit as set forth in claim 6, wherein said relief valve is formed with a passage therethrough connecting said chamber to said pumping compartment and includes a valve seat about said passage, and said pressure valve means includes a valve member normally secured to said valve seat by said securing means.

8. A unit as set forth in claim 7, wherein the valve member of said pressure valve means is contained in said passage.

9. A unit as set forth in claim 7, wherein said pressure valve means further includes a spring member abuttingly interposed between said valve member and said piston member in such a manner as to bias said valve member toward said valve seat.

10. A unit as set forth in claim 7, wherein said piston member is formed with an axial bore having a first portion open toward said chamber and a second portion communicating with said pumping compartment, the piston member having an internal shoulder in said bore intermediate said portions thereof, said relief valve having two opposite radial faces and being movably received in said bore, the unit further comprising resilient biasing means in said bore urging one of said radial faces of said relief valve into sealing engagement of a portion thereof with said internal shoulder, said passage in said relief valve extending therethrough between said portions of said bore, and said valve seat constituting an orifice of said passage toward said first bore portion.

11. A unit as set forth in claim 10, wherein said biasing means include a spring member in said second bore portion.

12. A unit as set forth in claim 10, wherein said piston member is formed with an axially extending chamber, and said biasing means include a plunger sealingly received in said piston member for movement inward and outward of said chamber, and a resilient fluid in said chamber of the piston member, said plunger being fixedly connected to said relief valve.

13. A unit as set forth in claim 10, wherein the other radial face of said relief valve is freely exposed in said second portion of said bore and has an area substantially equal to the area of said portion of said one radial face.

References Cited

FOREIGN PATENTS 620,616   5/1961   Italy.
275,895  10/1964   Netherlands.

ARTHUR L. LA POINT, *Primary Examiner.*

R. M. WOHLFORTH, *Assistant Examiner.*